US008478470B1

(12) United States Patent
Meads et al.

(10) Patent No.: US 8,478,470 B1
(45) Date of Patent: Jul. 2, 2013

(54) DRIVETRAIN SYSTEM HAVING RATE-LIMITED FEEDFORWARD FUELING

(75) Inventors: Matthew D. Meads, Peoria, IL (US); Keith A. Leisinger, Brimfield, IL (US); Rajeswari Addepalli, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/485,102

(22) Filed: May 31, 2012

(51) Int. Cl.
*F02M 23/00* (2006.01)
*F02M 21/00* (2006.01)
*B60W 10/00* (2006.01)

(52) U.S. Cl.
USPC ............. 701/22; 701/81; 701/82; 701/84; 701/86; 701/87; 180/185; 180/196; 180/201; 180/285; 477/5; 477/80; 477/127

(58) Field of Classification Search
USPC ....... 701/22, 81–82, 84, 86–87, 90, 103–104, 701/123–124; 180/185, 196, 201, 285, 301–302, 180/305; 477/5, 80, 127
See application file for complete search history.

(56) References Cited

U.S. PATENT DOCUMENTS

| 5,636,119 A | 6/1997 | Coutant et al. | |
|---|---|---|---|
| 5,967,756 A | 10/1999 | Devier et al. | |
| 7,098,628 B2 | 8/2006 | Maehara et al. | |
| 7,941,263 B2 * | 5/2011 | Nishi et al. | 701/104 |
| 2002/0052677 A1 * | 5/2002 | Lasson et al. | 701/22 |
| 2002/0063001 A1 * | 5/2002 | Lennevi | 180/65.2 |
| 2003/0203247 A1 * | 10/2003 | Keskula et al. | 429/13 |
| 2004/0034460 A1 * | 2/2004 | Folkerts et al. | 701/54 |
| 2005/0114007 A1 * | 5/2005 | Pillar et al. | 701/82 |
| 2007/0233332 A1 * | 10/2007 | Kawada et al. | 701/13 |
| 2009/0088945 A1 * | 4/2009 | Yi et al. | 701/103 |
| 2009/0276141 A1 * | 11/2009 | Surnilla et al. | 701/103 |
| 2010/0030449 A1 * | 2/2010 | Ikoma | 701/103 |
| 2010/0305833 A1 * | 12/2010 | Matsunaga et al. | 701/105 |

FOREIGN PATENT DOCUMENTS

EP 2 354 507 8/2011

\* cited by examiner

*Primary Examiner* — Mary Cheung
*Assistant Examiner* — Atul Trivedi
(74) *Attorney, Agent, or Firm* — Finnegan, Henderson, Farabow, Garrett & Dunner LLP

(57) ABSTRACT

A drivetrain system for a mobile machine is disclosed. The drivetrain system may have an engine, a generator driven by the engine to generate electric power, and a traction motor driven by the electric power from the generator. The drivetrain system may also have a controller in communication with the engine, the generator, and the traction motor. The controller may be configured to determine a change in loading on the traction motor, and determine a change in fueling of the engine that will be required to accommodate the change in loading on the traction motor. The controller may also be configured to selectively rate-limit the change in fueling, and implement the rate-limited change in fueling prior to transmission of the change in loading on the traction motor to the engine.

19 Claims, 2 Drawing Sheets

DRIVETRAIN SYSTEM HAVING RATE-LIMITED FEEDFORWARD FUELING

TECHNICAL FIELD

The present disclosure relates generally to a drivetrain and, more particularly, to a drivetrain system having rate-limited feedforward fueling.

BACKGROUND

Electric drive machines are quickly replacing mechanical drive machines both in on-highway and off-highway applications. An electric drive machine consists generally of an engine drivingly coupled to a generator. As a mixture of fuel and air is burned within the engine, a mechanical rotation is created that drives the generator to produce electric power. The electric power is sent to a motor or series of motors associated with traction devices of the machine to propel the machine.

Ideally, the engine drives the generator with a relatively constant torque and speed, and the generator accordingly produces a corresponding electrical output that is passed onto the traction motors. The traction motors are driven by the electric power from the generator to rotate at an operator selected speed and with a torque that varies with machine loading. A relatively constant engine torque and speed should result in relatively low fuel consumption and relatively smooth machine operation. However, the varying load on the traction motor can be affected by external factors that are often unpredictable and cannot always be controlled. And changes in torque loading of the motor can affect operation of the generator, which can translate into undesirable fluctuations in engine performance.

For example, when an external load is suddenly applied to the traction devices of the machine, the motor will draw extra power from the generator to maintain the operator-desired speed of the traction devices. This extra power drawn from the motor will load the generator, and the generator will attempt to provide for the increase in electric power demand by drawing more mechanical power from the engine and converting the additional mechanical power to electric power. To provide for the extra mechanical power, the engine must draw in extra combustion air and extra fuel. Similarly, when an electrical load is suddenly removed from the generator by the motor, the generator will quickly reduce its electric power production by drawing less mechanical power from the engine and the engine must respond by drawing in less combustion air and fuel.

Although the motor and generator may respond quickly to the changes in load, the engine may have a much slower response time. As a result of an increased mechanical load from the generator and due to the slower response of the engine, the engine may lug (i.e., the engine may slow as a torque load increases) until the additional fuel and air can be directed into the engine and the engine can begin producing the higher output of mechanical power required by the generator. Similarly, as a result of a decreased mechanical load and because of the slower response of the engine, the engine may overspeed until the fuel and air directed into the engine can be reduced. Engine lugging or overspeeding can cause machine performance to fluctuate undesirably.

Historically, attempts to smooth fluctuations in the performance characteristics of a machine having an electric drive have included feedforward fueling of the engine. Specifically, if the change in electric load applied to the motor can be sensed soon enough after its application, a fueling command indicative of an impending mechanical load change can be directed to the engine before that mechanical load change can cause the engine to operate undesirably. In this manner, the engine can be given time to respond to the impending mechanical load change prior to the mechanical load on the engine actually changing. This forewarning may help reduce a magnitude of engine lugging or overspeeding as a result of the mechanical load change.

One attempt to provide feedforward control is disclosed in U.S. Pat. No. 7,098,628 (the '628 patent) issued to Maehara et al. on Aug. 29, 2006. In particular, the '628 patent discloses a generator control system for a vehicle that includes an AC generator driven by an engine, a load current detector, a driving-torque-increase calculator, a field current control means, and an engine power adjusting means. During operation, the driving-torque-increase calculator calculates a predicted increase in driving torque required from the engine by the AC generator to provide for an increase in the current supplied to an electric load as detected by the load current detector. When the predicted increase in driving torque is greater than a predetermined value, the engine power adjusting means adjusts engine power according to the predicted increase. While engine power is being adjusted, the field current control means limits an increase rate of the generator's field current within a predetermined value. In one embodiment, the field current is limited until the engine attains a predetermined speed at the increased driving torque. In another embodiment, the field current is limited until a preset time passes after the engine power is adjusted. By limiting the field current during adjustment of engine power, the likelihood of engine lugging or overspeeding may be reduced.

Although the '628 patent may help reduce the likelihood of engine lugging or overspeeding, it may still be problematic. Specifically, because the field current is limited during the engine power adjustment, the electric power provided by the generator to an associated drive motor may be less than desired and result in an unresponsive machine. And because the engine power adjustment does not commence until after the change in electric load has already been applied to the generator, the duration of the less-than-desired performance may be substantial. Finally, because the generator control system only limits an increase rate of the generator's field current when the increase is greater than the predetermined value, the system may be prone to dithering performance in response to small changes (e.g., noise and short transient torque fluctuations) in loading at the motor.

The disclosed drivetrain system is directed to overcoming one or more of the problems set forth above and/or other problems of the prior art.

SUMMARY OF THE INVENTION

In one aspect, the present disclosure is directed to a drivetrain system. The drivetrain system may include an engine, a generator driven by the engine to generate electric power, and a traction motor driven by the electric power from the generator. The drivetrain system may also include a controller in communication with the engine, the generator, and the traction motor. The controller may be configured to determine a change in loading on the traction motor, and determine a change in fueling of the engine that will be required to accommodate the change in loading on the traction motor. The controller may also be configured to selectively rate-limit the change in fueling, and implement the rate-limited change in fueling prior to transmission of the change in loading on the traction motor to the engine.

In another aspect, the present disclosure is directed to a method of controlling a drivetrain system. The method may include determining a change in loading on an electric traction motor, and determining a change in fueling of an engine that will be required to accommodate the change in loading on the electric traction motor. The method may also include selectively rate-limiting the change in fueling, and implementing the selectively rate-limited change in fueling prior to transmission of the change in loading to the engine.

In yet another aspect, the present disclosure is directed to another drivetrain system. This drivetrain system may include an engine, and a traction motor operatively driven by the engine. The drivetrain system may also include a controller in communication with the engine and the traction motor. The controller may be configured to determine a change in loading on the traction motor, and determine a change in fueling of the engine that will be required to accommodate the change in loading on the traction motor. The controller may also be configured to selectively rate-limit the change in fueling, and implement the rate-limited change in fueling prior to transmission of the change in loading on the traction motor to the engine.

DETAILED DESCRIPTION

Figure 1:
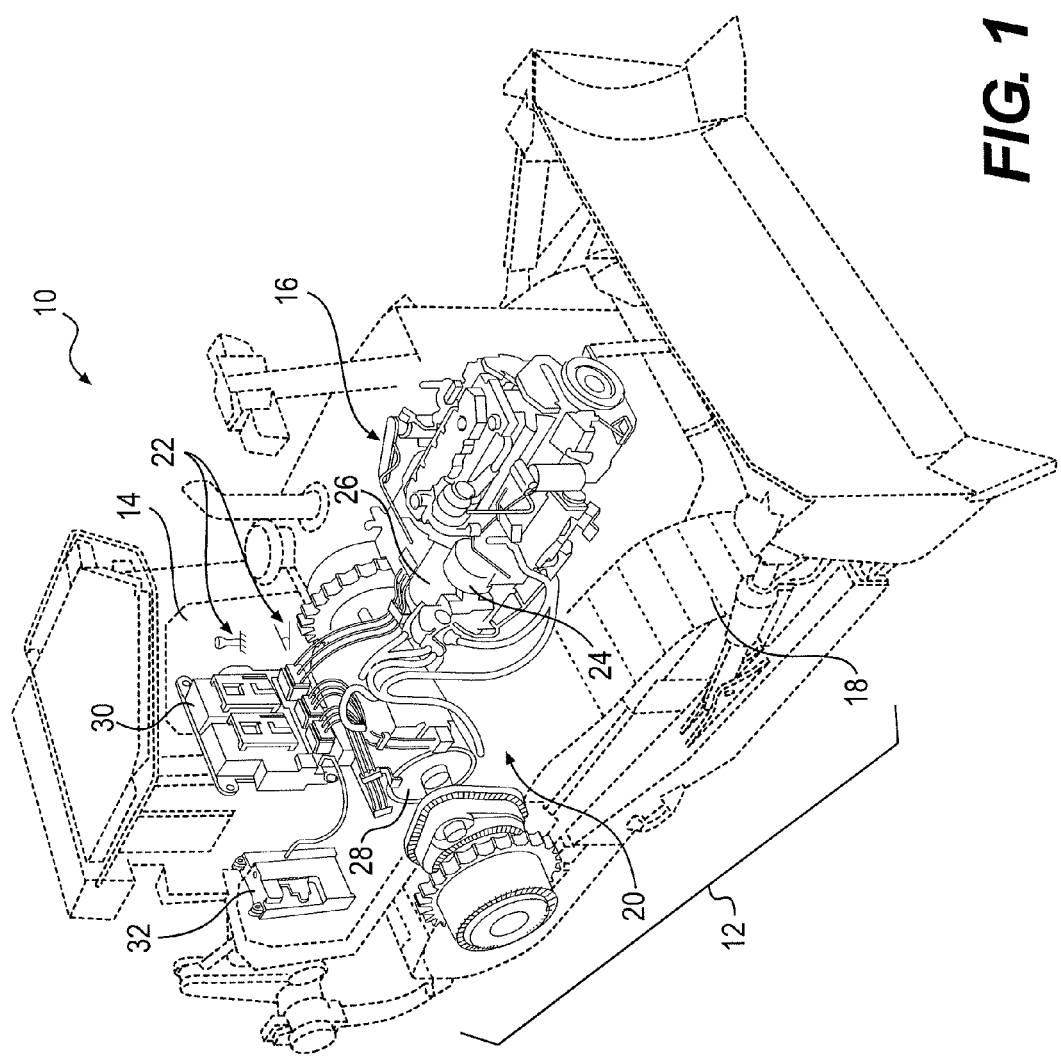
FIG. 1 is a pictorial illustration of an exemplary disclosed drivetrain system for a mobile machine.

FIG. 1 illustrates an exemplary machine 10. Machine 10 may be a mobile machine that performs some type of operation associated with an industry such as mining, construction, farming, transportation, or any other industry known in the art. For example, machine 10 may be an earth-moving machine such as a track-type tractor, a loader, an excavator, a haul truck, or another machine known in the art. Machine 10 may alternatively embody an on-highway vocational truck, a bus, a passenger vehicle, or other suitable operation-performing machine.

Machine 10 may be equipped with a drivetrain system 12 having multiple components that interact to propel and retard the motion of machine 10, and an operator station 14 for manual control of drivetrain system 12. Drivetrain system 12 may include, among other things, an engine 16 configured to generate a mechanical power output, one or more traction devices 18, and an electric drive 20 configured to convert and transmit the power output from engine 16 to traction devices 18. Operator station 14 may include one or more operator interface devices 22 located proximal an operator seat and configured to generate control signals associated with operation of drivetrain system 12. Exemplary interface devices 22 may include a gear selector and/or an accelerator pedal configured to generate signal(s) indicative of an operator's desire for drivetrain system 12 to propel machine 10. It should be noted that other operator interface devices 22 are also contemplated for use in controlling drivetrain system 12.

For the purposes of this disclosure, engine 16 is depicted and described as an internal combustion engine that combusts a mixture of fuel and air to produce the mechanical power output described above. One skilled in the art will recognize that engine 16 may be any type of combustion engine such as, for example, a diesel engine, a gasoline engine, or a gaseous fuel-powered engine.

Traction devices 18, in the disclosed example, include tracks located at opposing sides of machine 10. Traction devices 18 may be powered by electric drive 20 via a differential and/or final drives, and steering of machine 10 may be accomplished by creating a speed difference between traction devices 18. For example, a hydraulic actuator such as a brake and/or a motor (not shown), may be associated with each of traction devices 18 and powered with pressurized fluid to generate the speed differential. A hydraulic steering pump 24 may be powered by engine 16 to provide the pressurized fluid to the hydraulic actuator(s).

Electric drive 20 may include a generator 26 that provides electric power directed to one or more traction motors 28 (only one included in the exemplary embodiment). Generator 26 may be, for example, an AC induction generator, a permanent-magnet generator, an AC synchronous generator, or a switched-reluctance generator. In one embodiment, generator 26 may include multiple pairings of poles (not shown), each pairing having three phases arranged on a circumference of a stator (not shown) to produce an alternating current with a frequency of about 50-60 Hz. Electric power produced by generator 26 may be directed to traction motor 28 by way of one or more buses (not shown) and, in some embodiments, a converter 30.

Traction motor 28 may be generally operable to receive AC power from generator 26 via converter 30 and the buses, and to use the power to produce a mechanical output that drives traction devices 18 via the differential and/or final drives. For example, traction motor 28 may embody an AC induction motor connected to receive three-phase AC power from converter 30 and generate an output having a rotational speed and torque in accordance with an operator desired speed and torque of traction devices 18. It is contemplated that traction motor 28 may alternatively embody an AC synchronous motor or any other AC traction motor known in the art. It should be noted that traction motor 28 may additionally be operable to receive mechanical power from traction devices 18 and use the mechanical power to generate variable-frequency, variable-voltage AC power in a dynamic braking mode, if desired. It is contemplated that traction motor 28 may alternatively embody a DC traction motor such as, for example, a switched reluctance traction motor or a DC motor/generator, if desired.

Converter 30 may generally embody a three-phase converter with controllable frequency and/or voltage parameters such that a frequency and/or voltage of the AC power generated and/or received by converter 30 may be controllably set, as is known in the art. Converter 30 may include solid state electronics and be connected to traction motor 28 and generator 26 by dedicated or shared AC power buses.

A controller 32 may be associated with each of the components of drivetrain system 12. Controller 32 may embody a single or multiple microprocessors, field programmable gate arrays (FPGAs), digital signal processors (DSPs), etc. that form one or more modules for controlling various operations of drivetrain system 12, as will be described in more detail below. Numerous commercially available microprocessors can be configured to perform the functions of controller 32. It should be appreciated that controller 32 could readily embody a microprocessor separate from that controlling other machine functions or that controller 32 could be integral with a general machine microprocessor and be capable of controlling numerous machine functions and modes of operation. If separate from the general machine microprocessor, controller 32 may communicate with the general machine microprocessor via datalinks or other methods. Various other known circuits may be associated with controller 32, including power supply circuitry, signal-conditioning circuitry, actuator driver circuitry (i.e., circuitry powering solenoids, motors, or other actuators), communication circuitry, and other appropriate circuitry.

Controller 32 may be configured to regulate operations of drivetrain system 12 in response to operator input and/or in response to monitored performance of the associated components. For example, controller 32 may include a motor control module and an associated travel speed sensor (both not shown), which together may be configured to affect an output of traction motor 28 in response to an actual rotational speed of traction device 18 (as received from the travel speed sensor) and an operator desired speed (as received from interface device 22), as is known in the art. For example, as machine 10 encounters a steep incline and/or a tool of machine 10 is suddenly loaded with material and the travel speed of machine 10 slows down, the motor control module of controller 32 may detect the reduction in speed and responsively command an increased torque output of traction motor 28. Based on the command for increased torque output, traction motor 28 may draw more power from the associated power bus and increase its torque output until the actual travel speed of traction device 18 generally matches the desired travel speed. A sudden increase in detected travel speed may similarly result in a command for less torque output (or even reverse torque output) from traction motor 28 by controller 32.

As traction motor 28 draws more or less power from the associated power bus, the voltage of the bus may fall or rise proportionally. For this reason, controller 32 may include a generator control module and associated voltage or current sensors, which together may be configured to affect an output of generator 26 in response to the change in characteristics of the power bus. For example, as traction motor 28 draws more power from the bus and the corresponding voltage of the bus begins to drop, controller 32 may adjust the field windings of generator 26 to increase its output to the bus. Similarly, as traction motor 28 draws less power from the bus and the corresponding voltage of the bus begins to increase, controller 32 may again adjust the field windings of generator 26 to reduce its output to the bus. Other methods of adjusting generator output and/or characteristics of the power bus may also or alternatively be implemented, as desired.

As operation of generator 26 is adjusted to produce more or less electric power, a corresponding amount of mechanical power may be demanded from engine 16 by generator 26. In addition, other loads on engine 16 (e.g., loads placed on engine 16 by steering pump 24) may fluctuate, thereby further changing the demand for mechanical power from engine 16. Accordingly, controller 32 may also include an engine speed governor module and an engine speed sensor (both not shown), which together may be configured to affect fueling of engine 16 in response to a monitored speed of engine 16 and/or a desired engine speed, as is known in the art. With this exemplary configuration, as generator 26 (and/or steering pump 24) draws more mechanical power from engine 16 and the speed of engine 16 subsequently decreases, the engine speed governor module of controller 32 may observe a difference between the desired engine speed and the actual engine speed and responsively increase fueling of engine 16 to accommodate the change in load. Similarly, as generator 26 (and/or steering pump 24) draws less mechanical power from engine 16 and the speed of engine 16 subsequently increases, the engine speed governor module may observe the speed difference increase and responsively decrease fueling of engine 16 to accommodate the change in load. It is contemplated that controller 32 could alternatively or additionally affect operation of other engine components to vary the mechanical power output of engine 16, if desired, for example a variable geometry turbocharger, a wastegate, a bypass valve, a variable valve actuator, an exhaust gas recirculation control valve, an air/fuel ratio control device, a throttle, a power storage and discharging device (e.g., an uninterruptable power supply—UPS), or any other device known in the art.

Figure 2:
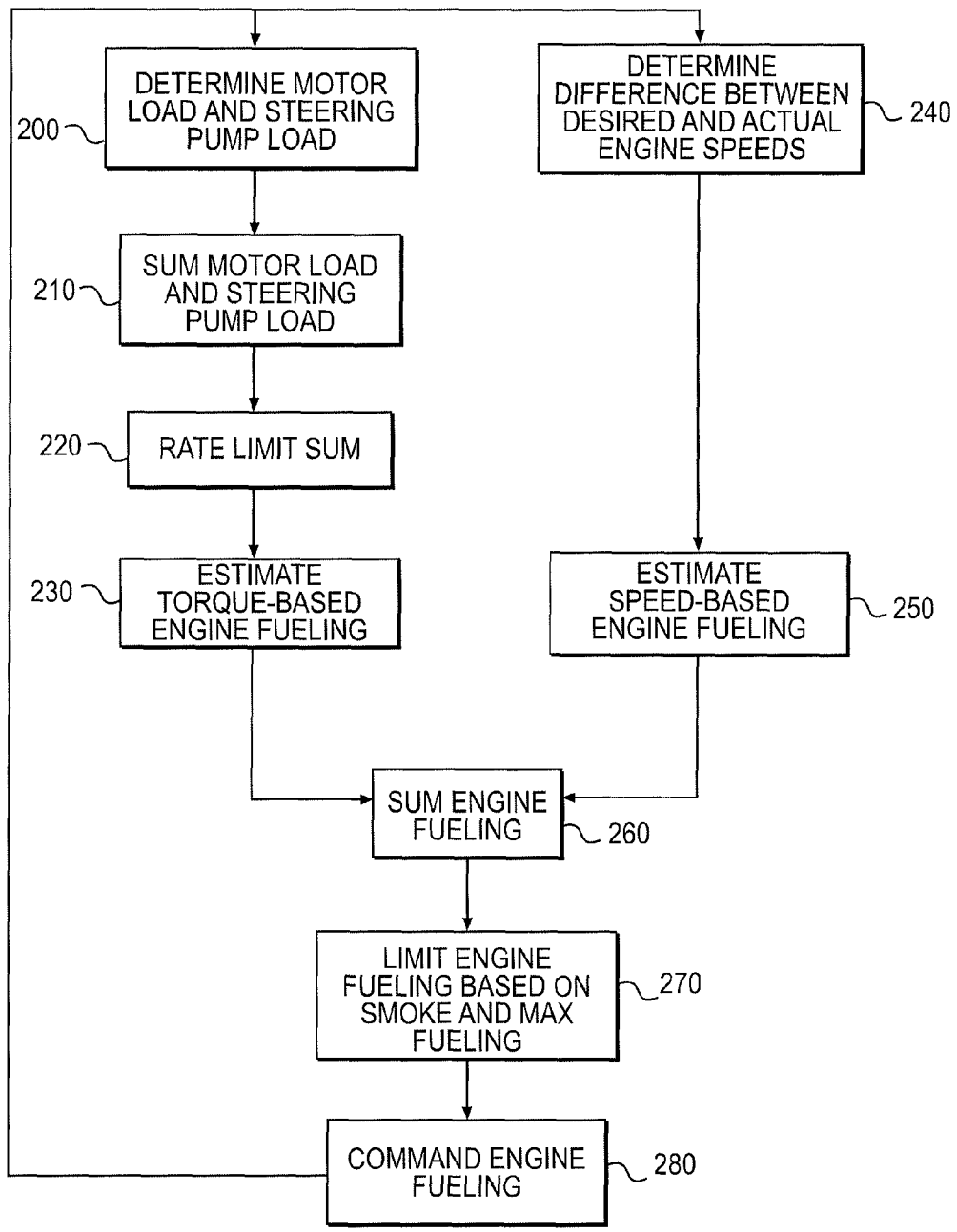
FIG. 2 is a flowchart of an exemplary disclosed method of drivetrain control that may be used in conjunction with the system of FIG. 1.

Controller 32 may be further configured to anticipate changes in loading, and affect operation of engine 16 before performance of engine 16 deviates from desired ranges (i.e., before the change in loading on traction motor 28 is transferred to engine 16 causing engine 16 to lug or overspeed significantly). The flowchart depicted in FIG. 2 illustrates an exemplary method of anticipatory control performed by controller 32. This method will be discussed in more detail in the following section to further illustrate the disclosed concepts.

INDUSTRIAL APPLICABILITY

The disclosed drivetrain system may be implemented into any mobile machine application where performance fluctuations are undesirable. The disclosed drivetrain system may help reduce performance fluctuations by accounting for impending load changes before the load changes are initiated, and by rate-limiting feedforward signals associated with the load changes. Control of drivetrain system 12 will now be described with respect to FIG. 2.

As illustrated in FIG. 2, controller 32 may continuously monitor loading of machine 10 to determine a total torque load that will be (but isn't yet) placed on engine 16. For example, controller 32 may monitor and/or determine a load on traction motor 28 (that hasn't yet been transmitted back through generator 26 to engine 16) and a load on steering pump 24 or other power consuming device of machine 10 (Step 200). The monitored load on traction motor 28 may be about equivalent to the torque command sent to traction motor 28 by the motor control module of controller 32 in response to a detected difference between actual travel speed and desired travel speed. The load on steering pump 24 may be determined based on a speed of steering pump 24, a displacement of steering pump 24, and a pressure of fluid being discharged from steering pump 24. The speed of steering pump 24 may be directly measured or, alternatively, calculated as a function of engine speed. The displacement of steering pump 24 may be a known and fixed value, a variable and sensed value, an assumed value, a commanded value, or a combination of these values, as desired. The pressure of fluid discharged from steering pump 24 may be sensed, calculated, and/or assumed. After determining the current operation of traction motor 28 and steering pump 24, controller 32 may sum the individual torque loads to determine an anticipated total torque load value for use as a feedforward control signal (Step 210).

In some situations, the total torque load value calculated in step 210 may be highly transient, changing about 30-50 times per second. Because engine 16 may be relatively slow to respond to changes in loading (as compared to generator 26 and motor 28), trying to change the mechanical output of engine 16 as frequently as the demand from traction motor 28 and steering pump 24 changes could cause engine performance to fluctuate undesirably and even out of phase relative to the demand. That is, engine 16 could be caused to increase its output when the corresponding demand for increased output no longer exists or is even replaced with a demand for decreased output, and vice versa. Accordingly, controller 32 may be configured to first limit a change rate of the feedforward control signal associated with the impending total torque load, before using the feedforward control signal to adjust current operations (e.g., fueling) of engine 16 (Step 220). That is, controller 32 may not limit the change in the torque load actually experienced by steering pump 24, motor 28, and/or generator 26, but instead limit only the rate of change in the value of the feedforward control signal associated with the total torque load that is subsequently used to adjust engine fueling.

Controller 32 may rate-limit the feedforward control signal in any suitable manner. In one exemplary embodiment, controller 32 limits the change in the feedforward control signal to about 10% of a peak torque load of engine 16 per second. For example, when the total torque load changes by less than about 10% of a peak torque load of engine 16 within about one second, controller 32 may use the full value of the total torque load as the feedforward control signal to regulate fueling of engine 16. However, when the total torque load changes by a greater amount and/or within a shorter period of time, controller 32 may reduce the change rate of the feedforward control signal to about 10% of the peak torque load per second.

In some applications, controller 32 may only rate-limit the feedforward control signal under particular conditions. For example, controller 32 may only rate-limit the feedforward control signal when a directional shift of machine 10 is not occurring. In other words, controller 32 may not limit the value of the feedforward control signal when machine 10 is transitioning from forward travel to reverse travel or from reverse travel to forward travel. In this manner, operator-directed changes in travel direction, which should not significantly affect engine operation for an extended period of time, may not be delayed due to the rate limiting.

In the same or other applications, controller 32 may limit the change rate of the feedforward control signal only during a torque reduction, and use the full value of the feedforward control signal during a torque increase. It is contemplated, however, that controller 32 could alternatively limit the value of the feedforward control signal only during a torque increase, if desired. In this manner, machine 10 may selectively trade efficiency for responsiveness or responsiveness for stability, as is desired by the operator and/or manufacturer of machine 10.

In yet other applications, controller 32 may be configured to rate-limit the feedforward control signal based on a magnitude of the current torque output of engine 16 and a magnitude of the change in total torque load. In particular, the torque output of engine 16 can be divided into three regions (more or fewer regions may be utilized, if desired), including a low-torque region, a medium-torque region, and a high-torque region. The low-torque region may consist of torque load values of about 0-30% of the peak torque load of engine 16. The medium-torque region may consist of torque load values of about 30-70% of the peak torque load. The high-torque region may consist of torque load values of about 70-100% of the peak torque load. As long as the anticipated change in total torque load will move the output of engine 16 from one region to another, the change rate of the feedforward control signal may remain unlimited. In other words, when the change in total torque load is large (and not due to noise or other small fluctuations in motor loading), controller 32 may use the entire value of the feedforward control signal to control fueling of engine 16. In contrast, when the change in total torque load will result in the torque output of engine 16 remaining within the same region, controller 32 may rate-limit the value of the feedforward control signal to reduce the likelihood of engine operation dithering. That is, when the change in total torque load is relatively small, the change rate of the feedforward control signal may be limited so as to cancel out changes in loading due to noise or other highly-transient effects. It is contemplated that controller 32 may similarly rate-limit the feedforward control signal when the total torque load will result in a jump between extreme load ranges (e.g., from the low-torque range to the high-torque range), if desired.

It is contemplated that any of the strategies described above for limiting the change rate of the total torque load may be simultaneously utilized, if desired. For example, controller 32 may be configured to rate-limit the feedforward control signal only during deceleration of machine 10 in a single travel direction when the change in torque loading will remain within a single load region.

After rate-limiting the value of the feedforward control signal, controller 32 may determine a fueling of engine 16 that should result in production of a mechanical output corresponding to the total torque load (Step 230). Controller 32 may determine engine fueling by referencing the rate-limited total torque load with a control map, an algorithm, an equation, or a combination of these things. The control map, algorithm, and/or equation may be determined through laboratory testing and periodically updated as machine 10 ages or worksite conditions change.

At any time during completion of steps 200-230, controller 32 may also determine a difference between a desired engine speed and an actual engine speed. The desired engine speed may be determined based on one or more signals from interface device 22, for example a gear selection signal and/or a throttle signal. The actual engine speed may be determined based on a signal from the engine speed sensor. Other ways for determining desired and/or actual engine speeds may also be utilized.

Controller 32 may then estimate an amount of engine fueling that should reduce the difference between the actual and desired engine speeds (Step 250). For example, controller 32 may determine an increase or decrease in the output torque of engine 16 required to decrease a difference between the actual and desired engine speeds, a corresponding change in load on engine 16, and an associated fueling of engine 16. In effect, controller 32 may determine a feedback control signal in step 250 that accounts for error in a previous cycle through the method of FIG. 2. Controller 32 may utilize the same and/or different control maps, algorithms, and/or equations described above for this purpose.

Controller 32 may then sum the estimated fueling of engine 16 determined in steps 230 and 250 (i.e., the feedforward and feedback control signals) to determine a total amount of engine fueling that will be required to maintain the speed of engine 16 at the speed desired by the operator once the current loading on traction motor 28 is mechanically transmitted to engine 16 (Step 260). In some situations, this total amount of fueling may exceed design limitations of machine 10. For example, the total amount of fueling could cause engine 16 to produce smoke in excess of predetermined thresholds. Or, the total amount of fueling could surpass fueling thresholds associated with a maximum torque output of engine 16. In either of these situations, controller 32 may be configured to limit engine fueling (Step 270). It should be noted that, when controller 32 limits engine fueling based on smoke or torque thresholds, the actual speed of engine 16 may deviate from the speed desired by the operator. Controller 32 may then override the operator-desired speed, if necessary, and command the resulting fueling of engine 16 (Step 280).

Because the disclosed drivetrain may rate-limit its feedforward control signal, the operation of engine 16 and machine 10 may have improved responsiveness and stability. Specifically, the changes in output torque of engine 16 may better track the performance of traction motor 28. In addition, the rate of change of engine fueling may be selectively reduced such that noise and other highly-transient effects on traction motor 28 may not be transmitted to engine 16.

It will be apparent to those skilled in the art that various modifications and variations can be made to the disclosed drivetrain. Other embodiments will be apparent to those skilled in the art from consideration of the specification and practice of the disclosed drivetrain. For example, although the disclosed method of rate-limiting feed-forward fueling has been described with reference to an electric drivetrain, it is contemplated that the same method may be similarly utilized for another type of drivetrain, for example a hydraulic drivetrain, a mechanical drivetrain, or a hybrid drivetrain, if desired. It is intended that the specification and examples be considered as exemplary only, with a true scope being indicated by the following claims and their equivalents.

What is claimed is:

1. A drivetrain system, comprising:
   an engine;
   a generator driven by the engine to generate electric power;
   a traction motor driven by the electric power from the generator; and
   a controller in communication with the engine, the generator, and the traction motor, the controller being configured to:
   determine a change in loading on the traction motor;
   determine an anticipated change in loading on the engine based on the determined change in loading on the traction motor;
   determine a change in fueling of the engine that will be required to accommodate the change in loading on the traction motor;
   selectively rate-limit the change in fueling by rate-limiting a value of the anticipated change in loading on the engine; and
   implement the rate-limited change in fueling prior to transmission of the change in loading on the traction motor to the engine.

2. The drivetrain system of claim 1, wherein the value of the anticipated change in loading on the engine is selectively rate-limited to about 10% of a peak engine load per second.

3. The drivetrain system of claim 1, wherein the controller is configured to selectively rate-limit the change in fueling only during travel in a single direction.

4. The drivetrain system of claim 1, wherein the controller is configured to selectively rate-limit the change in fueling only when the change in loading on the traction motor is a reduction.

5. The drivetrain system of claim 4, wherein the controller is configured to selectively rate-limit the change in fueling only when the reduction is less than a threshold amount.

6. The drivetrain system of claim 5, wherein:
   a torque output of the engine is divided into multiple torque ranges; and
   the controller is configured to selectively rate-limit the change in fueling only when the reduction in loading on the traction motor will result in the torque output of the engine remaining within a single range of the multiple torque ranges.

7. The drivetrain system of claim 5, wherein the controller is further configured to:
   determine a change in engine fueling based on a difference between an actual engine speed and a desired engine speed; and
   implement a sum of the selectively rate-limited change in engine fueling and the change in engine fueling determined based on the difference between the actual engine speed and the desired speed.

8. The drivetrain system of claim 7, wherein the controller is further configured to limit the sum based on one of a smoke limit and a maximum torque limit.

9. The drivetrain system of claim 1, wherein the controller is configured to selectively rate-limit the change in fueling only when the change in loading on the traction motor is less than a threshold amount.

10. The drivetrain system of claim 1, wherein the controller is further configured to:
    determine a change in engine fueling based on a difference between an actual engine speed and a desired engine speed; and
    implement a sum of the selectively rate-limited change in engine fueling and the change in engine fueling determined based on the difference between the actual engine speed and the desired speed.

11. The drivetrain system of claim 1, wherein the controller is further configured to limit fueling of the engine based on one of a smoke limit and a maximum torque limit.

12. A method of controlling a drivetrain system, comprising:
    determining a change in loading on an electric traction motor;
    determining an anticipated change in loading on an engine based on the determined change in loading on the traction motor;
    determining a change in fueling of an engine that will be required to accommodate the change in loading on the electric traction motor;
    selectively rate-limiting the change in fueling by rate-limiting a value of the anticipated change in loading on the engine; and
    implementing the selectively rate-limited change in fueling prior to transmission of the change in loading on the electric traction motor to the engine.

13. The method of claim 12, wherein selectively rate-limiting the value of the anticipated change in loading on the engine includes selectively rate-limiting the value of the anticipated change in loading on the engine to about 10% of a peak engine load per second.

14. The method of claim 12, wherein selectively rate-limiting the change in fueling includes selectively rate-limiting the change in fueling only during travel in a single direction.

15. The method of claim 14, wherein selectively rate-limiting the change in fueling includes selectively rate-limiting the change in fueling only when the change in loading on the electric traction motor is a reduction.

16. The method of claim 15, wherein selectively rate-limiting the change in fueling includes selectively rate-limiting the change in fueling only when the reduction is less than a threshold amount.

17. The method of claim 16, further including:
    determining a change in engine fueling based on a difference between an actual speed of the engine and a desired speed of the engine;
    summing the rate-limited change in engine fueling and the change in engine fueling determined based on the difference between the actual and desired speeds of the engine limiting;
    selectively limiting the sum based on one of a smoke limit and a maximum torque limit; and
    implementing the selectively limited sum.

18. A mobile machine, comprising:
an engine;
a generator mechanically driven by the engine to produce electric power;
a traction device;
a motor configured to consume the electric power and drive the traction device; and
a controller in communication with the engine, the generator, and the motor, the controller being configured to:
determine a change in loading on the motor;
determine an anticipated change in loading on the engine based on the change in loading on the motor;
selectively rate-limit the anticipated change in loading on the engine only during travel of the mobile machine in a single direction when the change in loading on the motor is a reduction less than a threshold amount;
determine a first change in fueling of the engine based on the rate-limited and anticipated change in loading on the engine;
determine a second change in engine fueling based on a difference between an actual speed of the engine and a desired speed of the engine;
sum the first and second changes in fueling of the engine;
selectively limit the sum of the first and second changes in fueling based on one of a smoke limit and a maximum torque limit and selectively rate-limit the first change in fueling of the engine by rate-limiting a value of the anticipated change in loading on the engine; and
implement the selectively limited sum of the first and second changes in fueling.

19. A drivetrain system, comprising:
an engine;
a traction motor operatively driven by the engine; and
a controller in communication with the engine and the traction motor, the controller being configured to:
determine a change in loading on the traction motor;
determine an anticipated change in loading on the engine based on the determined change in loading on the traction motor;
determine a change in fueling of the engine that will be required to accommodate the change in loading on the traction motor;
selectively rate-limit the change in fueling by rate-limiting a value of the anticipated change in loading on the engine; and
implement the rate-limited change in fueling prior to transmission of the change in loading on the traction motor to the engine.

\* \* \* \* \*